United States Patent Office 2,700,348
Patented Jan. 25, 1955

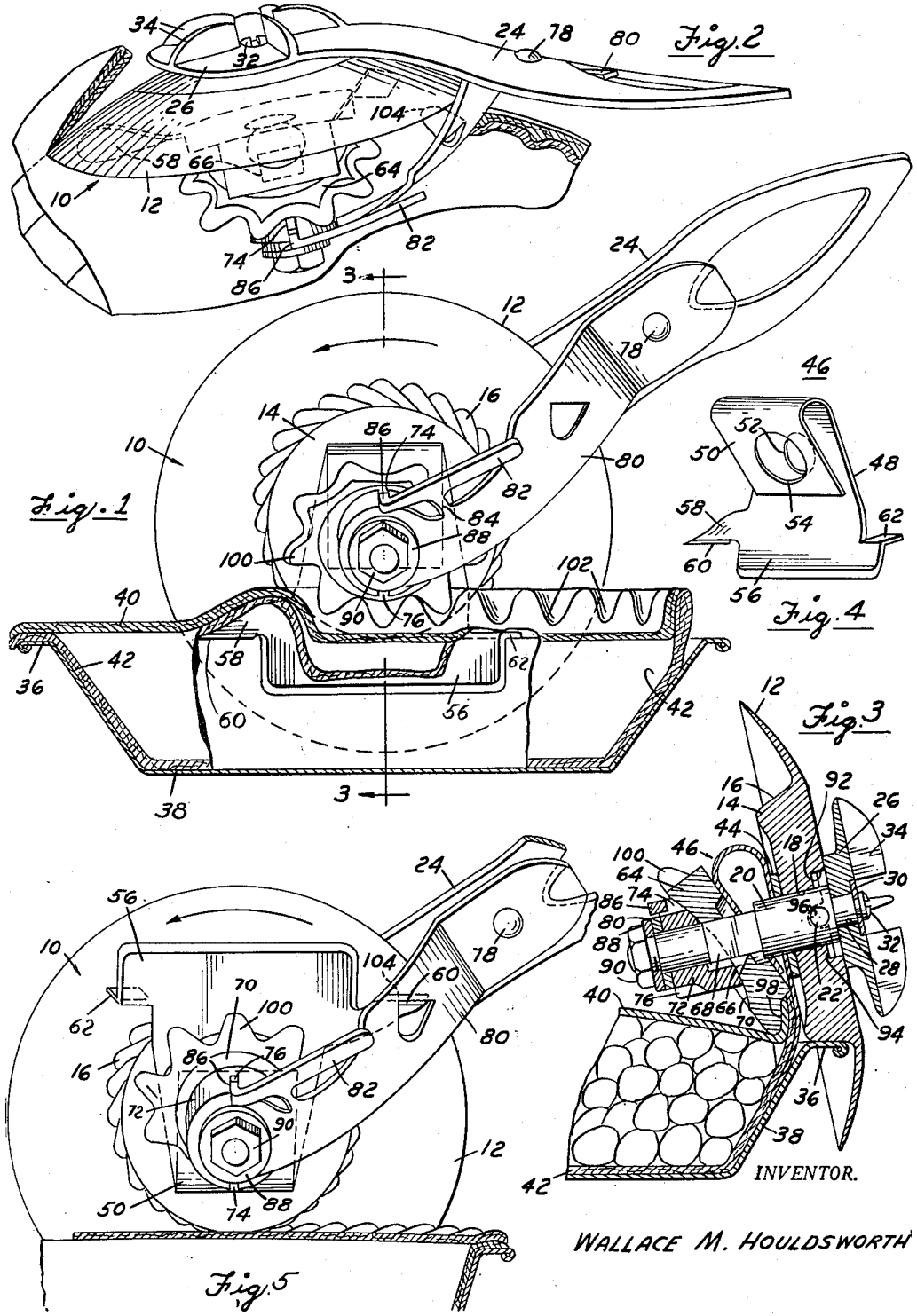

2,700,348

PIECRUST TRIMMER AND CRIMPER

Wallace M. Houldsworth, Royal Oak, Mich.

Application December 3, 1949, Serial No. 130,949

8 Claims. (Cl. 107—49)

This invention relates to devices utilized in the making of pies and the like and particularly to a device for marking, trimming and crimping the pie crust.

An important object of the invention is to provide a device for trimming and crimping pie crusts which travels around the rim of a pie pan and while so doing severs the excess amount of crust material, crimps the remaining edge of the pie crust, and frees the edge of the pie crust from the pan in order that the pie, when later baked, may be easily removed from the pan. Another important object of the invention is to provide an improved device of this character which is capable in one operation of severing the excess material from the pie crust and at the same time crimping the remaining edge of the crust.

A further important object of the invention is to provide a device of this character which enables one to make a fuller, juicier and easily removable pie in a conventional pie pan and accomplishes this result in a novel manner before baking by trimming the crust of excess material and in the same operation raising the outer edge of the crust, or that portion of the crust which rests upon the rim of the pan, and in this raised condition crimping the edge of the crust. A further important object of the invention is to provide a device of this character which is so constructed that it will perform the crimping and trimming operations on pies of single and double crusts and includes means for adjusting the device for operation upon either single or double crust pies.

In carrying out the invention, the device includes a rotatable compound crimping and trimming wheel which rolls around the rim of a pie pan and simultaneously severs the excess crust material therefrom while imparting an ornamental crimp in the remaining edge of the pie crust. Associated with the device and moving with the wheel is a member which enters between the pie crust and the rim of the pan and raises the former to a substantial vertical position free of the pan. This member cooperates with an ornamental marking wheel of the device to pinch the edges of the top and bottom crusts together in sealing engagement. An important feature of the invention is the the removable mounting of the several operating parts of the device which enables replacement of parts by the user in order to obtain different kinds of crimping designs. Another important feature of the invention is the construction and assembly of the parts which enables them to be economically manufactured and assembled and enables the device to operate efficiently and reliably.

All of the foregoing and still further objects and advantages of the invention will become more fully apparent from a study of the following specification, taken in connection with the accompanying drawings, wherein:

Fig. 1 is a side elevation of the device constructed in accordance with this invention and showing the use thereof upon the crust of a pie contained within a conventional pie pan, Fig. 2 is a top plan view of the device of Fig. 1, showing the operation thereof on the edge of pie pan, Fig. 3 is a vertical cross sectional view taken along line 3—3 of Fig. 1, Fig. 4 is a perspective view of one member of the assembly, and Fig. 5 is a side elevation similar to Fig. 1 but showing certain parts in inverted relationship for the purpose of crimping horizontal edges of pie crusts.

Referring now to the drawings, it will be seen that the embodiment of the invention herein illustrated comprises a trimming wheel generally indicated at 10 and exhibiting a concave or saucer-shaped formation. The periphery of the wheel is tapered to form a cutting edge 12. Forming part of the wheel 10 and preferably integrally connected thereto is an inwardly projecting central boss 14. The boss is of less diameter than the cutter 12 and may have its periphery 16 shaped with any desired marking configuration, such as the fluted design shown. In use the boss bears on the rim of the pan and when rolled therearound causes the cutter 12 of the wheel 10 to sever the excess crust material overhanging the edge of the rim. The wheel 10 is provided with an axial bore 18 through which extends a shaft 20. A pin 22 couples the wheel 10 to the shaft 20 for joint rotation in a manner particularly described hereinafter.

A handle is provided for guiding the trimming wheel 10 around the edge of a pie pan. The handle consists in the main of a stock or shank 24 which may be longitudinally bowed, as shown in Fig. 2, and slightly transversely curved. The handle is provided with a hub portion 26, as shown in Figs. 2 and 3, and is provided with a bore 28 through which the outer reduced end portion of the shaft 20 extends. A washer 30 and a screw 32, or other suitable fastening means, connects the hub portion of the handle to the reduced outer end of the shaft. The outer reduced end of the shaft 20 is journaled for rotation in the hub of the handle permitting the wheel 10 to rotate relative to the handle as it rolls over the rim of a pie pan. The hub portion 26 may be provided with outwardly projecting radial ridges 34 which may be used for marking the top of pie crusts with flower or star designs, either before or after the edge of the crust has been trimmed and crimped.

The device is provided with novel means for lifting or raising the edges of both the top and bottom crust layers of a pie above the rim of the pie pan and while so raised sealing the edges together while at the same time imparting a decorative crimp thereto. As shown particularly in Fig. 3, the shaft 20 projects inwardly beyond the trimming wheel. In use, when the boss 14 bears upon the rim 36 of a pie pan 38, the shaft 20 projects inwardly from the rim in overlying spaced relationship to the upper crust 40 of a pie. The axis of the shaft 20 in this position usually assumes the inclination shown in Fig. 3. The bottom crust 42, as in conventional practice, extends up the side of the pan and prior to trimming and crimping laps over the rim 36 in the manner shown at the left of Fig. 1. The edge of the top crust 40 overlies the rim 36 of the pan in superimposed relationship to the bottom crust 42. Carried by the inwardly projecting end of the shaft 20 is an assembly of elements which, as the device is rolled around the pie pan, lifts the two edges of the pie crusts 40 and 42 and raises the same above the rim 36 to free the bottom crust therefrom. While so raised, these elements pinch the two edges of the crusts together and impart an ornamental crimp thereto, as shown by a comparison of the left and right hand portions of Fig. 1.

Carried by the shaft 20 is a washer 44 which acts as a spacer between the inner face of the boss 14 and a substantially vertically extending floating plate, generally indicated at 46, which is mounted on the shaft 20. The floating plate is formed out of flat sheet metal material and, as shown in Fig. 4, has a longer side 48 which lies flat against the washer 44 and a shorter side 50 which is curved away from the inner face of the wheel and then curved back toward the wheel, being spaced inwardly along the shaft 20 and is inclined toward the side 48 in the manner shown in Fig. 3. The two sides 48 and 50 of the floating plate are provided with aligned holes 52 and 54 respectively through which the shaft 20 extends and in this manner the plate is mounted on the shaft adjacent to the washer 44. The hole or aperture 54 of the side 50 of the plate 46 is made larger than the hole 52, as shown in Fig. 4, in order to surround the shaft 20 with clearance in whatever position the side 50 may be flexed during the operation of the device.

The side 48 is provided with a lower portion 56 which is formed to bring a light spring pressure against the inside surface of the side wall of the pie pan 38 and between the side wall and the bottom pie crust 42, as indicated in Fig. 3. The plate 46 is provided with a finger 58 projecting forwardly from the bottom portion 56. The finger 58 is provided with a quarter twist to give it a flat horizontally extending forward edge 60 which rests on the rim 36 of the pie pan near the cutting edge 12 of the wheel 10. In this position, the forward edge 60 extends under the edge of the bottom crust 42 and as the device is moved around the pie pan serves to raise the edges of the two crusts to a substantially vertical position, shown at the right of Fig. 1. The action of the finger 58 in raising the edges of the pie crust is illustrated in Fig. 1. The finger cooperates with the cutting edge 12 of the wheel 10 and as soon as the former has severed excess crust material the finger sliding beneath said crust causes it to slide up the contour of said finger to the vertical position. The floating plate 46 is provided with a rear ledge 62 that allows clearance between the rim 36 and said ledge 62 in forward movement, but preventing rotation of said plate 46 in rearward movement.

Mounted on the shaft 20 immediately adjacent to the inner side 50 of the floating plate 46 is a crimping wheel 64 having a central hole 66, square-shaped in cross section, which slidingly fits a squared portion 68 of the shaft 20 for joint rotation in an inclined position therewith. Hole 66 is relieved outwardly on both sides from its minimum area to allow the wheel 64 to assume the inclination to the axis of the shaft shown in Fig. 3. The inner face 70 of the crimping wheel 64 has a concave surface, as shown in Fig. 3, which bears against a sleeve-shaped member 72, the end of which is inclined to the axis of the shaft and has a convex surface for bearing contact upon the concave face 70 of the crimping wheel 64. The sleeve member 72 has a free fit on the shaft 20 and is provided with a longitudinal slot or groove 74 on its short upper side and may have a slot or groove 76 on its lower longer side. The two slots 74 and 76 cooperate with means associated with the handle 24 to hold the sleeve member 72 against rotation on the shaft 20.

Secured to the handle 24 intermediate its ends, such as by a rivet 78, is a bracket member 80 which forms a forked handle and extends to the inner end of the shaft 20 and is connected thereto while permitting free rotation of the shaft.

Associated with the bracket 80 is means to prevent rotation of the sleeve member 72, a retractable latch member may be used as shown to engage the sleeve member 72 and hold the same against rotation. In the illustrated embodiment of the invention, the latch member is indicated at 82 and is of the T-shaped formation shown in Fig. 1. Although the latch member may be connected to the bracket 80 for movement relative thereto in any suitable manner, it is herein shown integrally connected by its leg portion 84 to the upper side of the bracket. The leg portion 84 is resistingly twistable about its axis and permits the cross of the T to swing a limited distance. One end of the latch member 82 is bent at 86 to form a detent for entering the slot 74 of the sleeve member, and in the normal position of the parts the detent projects into the slot and holds the sleeve member against rotation. The opposite end of the latch member 82 serves as a handle which may be grasped by the fingers to pivot the latch on the leg portion 84 to retract the detent and free the sleeve member for angular adjustment.

The shaft connected end of the bracket 80 is mounted on the shaft by an assembly comprising a washer 88 and a nut 90 threaded on the reduced inner end of the shaft, as shown in Fig. 3. In lieu of the washers and nuts employed at the opposite ends of the shaft 20, the latter may be peened over to hold the assembly of parts thereon.

Heretofore the pin 22 was described as securing the wheel 10 to the shaft. This pin projects from opposite sides of the shaft and is received in a counterbore 92 located in the outer face of the wheel 10, said counterbore having a pair of indented grooves or slots 94 which are diametrically opposite one another. In one position of the parts the pin 22 is received in the grooves 94—94. The counterbore 92 is provided with another pair of diametrically opposite grooves or slots 96—96 disposed 90° to the grooves 94—94 which are deeper than the latter. Upon a quarter turn of the shaft relative to the wheel 10, the pin 22 may be received in the deeper slots 96—96, as shown in Fig. 3. This adjustment is provided in order to enable the parts to be set up for operating upon either a single crust pie or a double crust pie.

The floating plate 46 depends from the shaft 20 and has its lower portion 56 entering between the bottom crust 42 and the side wall of the pan, as previously mentioned. The floating plate does not rotate with the wheel or the shaft and is held against rotation by the finger 58 and the ledge 62, previously described, which extend over the surface on which the wheel rolls or the pan rim, but short of contact therewith when paralleled thereto, because the wheel must have a bearing for rotation, the plate will have a tendency to rotate with said wheel when assembled on the pan rim, thus the finger 58 or the ledge 62 will contact the pan rim 36 as the other is raised allowing clearance thereof, depending upon the direction in which the device is rolled. The finger 58 sliding beneath the crust material after trimming causes said crust to follow the contour of said finger and the lower portion 56 of the floating plate, and the raised crust enters a space 98 between the crimping wheel 64 and the lower portion 56 of the floating plate, as shown in Fig. 3. During the operation of the device, the shaft 20 is rotated by virtue of its engagement with the drive pin 22 which holds the trimming wheel thereto, and as the device travels around the rim of the pan the crimping wheel 64 is held at an angle to the axis of the shaft by the spring pressure of the floating plate above the shaft so that the teeth 100 of the crimping wheel can pinch or press the crust material in the space 98 against the floating plate, leaving the scallop formation 102, shown in Figs. 1 and 2. The side 50 of the floating plate causes the crimping wheel 64 to extend at the inclination shown and exerts a spring pressure to hold the wheel 64 against the inclined spherical convexed end of the sleeve member 72. Thus, during the operation of the device, the crimping wheel 64 assumes the inclined position shown while rotating freely with the shaft 20. It is evident that various types of crimping wheels 64 may be substituted for one another to produce a different crimped crust.

The space 98 in which the edges of the crust material enter is controlled by the location of the trimming wheel on the shaft by the pin 22 and said space 98 may be changeable with respect to the indented slots 94—94 and 96—96. For double crust pies where two thicknesses of crust material enter the clearance 98, the pin is adjusted to enter the deeper pair of grooves 96—96, as shown in Fig. 3. For a one layer crust pie, the clearance 98 is reduced by adjusting the drive pin to the shallower pair of indented grooves 92—92. For a double pie crust the space 98 is preferably approximately ⅛" wide; for a single pie crust the space 98 may be approximately ¹⁄₁₆" wide. Thus, the two pairs of indented slots or grooves 94—94 and 96—96 differ in depth by approximately ¹⁄₁₆" in order to vary the space 98 this amount.

The device may be made adjustable for optional crimping of the crust horizontally on the rim 36 of the pie pan. For this purpose the sleeve member 72 is rotatably adjustable about the axis of the shaft when freed by the detent 86. When the sleeve member is rotated 180° from the position shown in Fig. 3, its longer side will be disposed above the shaft 20 and its shorter side will be located below the shaft. Likewise, when the floating plate 46 is rotated 180° from its position shown in Fig. 3, it will carry its wider end which is normally below the shaft to the position above the shaft. It is evident that upon retraction of the detent 86 and rotation of the sleeve member and the floating plate an angular distance of 180° that the crimping wheel 64 will be inclined opposite to its position shown in Fig. 3, thereby spacing the lower peripheral portion thereof inwardly a greater distance from the rim 36 and the bearing point of the trimming wheel 10 than that shown in Fig. 3. The inverted position of the sleeve member 72 and the floating plate 46 is shown in Fig. 5. In this inverted position, the sleeve member is releasably locked by the engagement of the detent 86 in the slot 76 which previously was on the underside of the shaft, as shown in Fig. 3. The floating plate is held in its inverted position against rotation by the engagement of the lateral projecting portion 60 of the finger 58 to a ledge 104 struck out of the bracket 80. This enables the device to crimp the trimmed edges of the pie crust while overlying the pan rim 36 in horizontal position, as shown in Fig. 5. The device is therefore adaptable to crimping or pinking the trimmed edges of the crusts in either the raised position shown at the right of Fig. 1 or in the horizontal position shown in Fig. 5.

As a result of this invention, there is provided a device which is capable of rolling around the rim of a pie pan and substantially simultaneously severing the excess crust material and raising the trimmed edge of the crust material to free it from the pie pan. The device is provided with the crimping wheel 64, which may have its periphery shaped in any desired manner, and which cooperates with the floating plate to pinch the raised trimmed edges of the crust material to provide an attractive design as well as to seal the top and bottom crusts together. The device may be adjustable to vary the spacing between the trimming and crimping wheels and furthermore it may be adjustable to enable optional use of the device to trim and crimp the crust material as it lies upon the pie pan rim.

What I claim is:

1. In a culinary utensil, in combination, a shaft having first and second wheels centrally mounted thereon while being secured for rotation therewith, said first wheel having a centrally located boss with its periphery forming a bearing surface, means mounting said second wheel on said shaft permitting tilting of said wheel on an axis transverse to the axis of said shaft, a floating plate journaled on said shaft between said wheels, said plate having a bottom portion projecting from one side of the shaft and beyond the tangential plane on which the first wheel bears, the upper portion of said plate having integral therewith a substantially U-shaped resilient member, opening downwardly in inclined relation toward the said bottom portion and being so proportioned as to lie in contact with the inwardly directed face of said second wheel when in assembled relation, a sleeve member journaled on said shaft in contact with and exteriorly of said second wheel, the wheel contacting face of said sleeve member being on a bias with respect to its axis, whereby under the influence of said spring portion said second wheel is inclined so that its lowermost peripheral portion will be spaced from said plate less than its uppermost peripheral portion, and so maintained during rotary movement of said wheels.

2. In a culinary utensil, in combination, a shaft having first and second wheels centrally mounted thereon while being secured for rotation therewith, said first wheel having a centrally located boss with its periphery forming a bearing surface, means mounting said second wheel on said shaft permitting tilting of said wheel on an axis transverse to the axis of said shaft, a floating plate journaled on said shaft between said wheels, said plate having a bottom portion projecting from one side of the shaft and beyond the tangential plane on which the first wheel bears, the upper portion of said plate having integral therewith a substantially U-shaped resilient member, opening downwardly in inclined relation toward the said bottom portion and being so proportioned as to lie in contact with the inwardly directed face of said second wheel when in assembled relation, a sleeve member journaled on said shaft and in contact with and exteriorly of said second wheel, the wheel contacting face of said sleeve member being on a bias with respect to its axis, whereby under the influence of said spring portion said second wheel is inclined so that its lowermost peripheral portion will be spaced from said plate less than its uppermost peripheral portion, and so maintained during rotary movement of said wheels, an upturned finger located along the forward upright edge of the bottom portion of the plate and offset to extend in advance of the first wheel, said finger curved inwardly by a quarter twist from said upright edge to a flattened forward horizontal formation, said formation terminating tangential to the plane on which said wheel bears, thereby upturning that which is in the path of said first wheel into the path of the second wheel.

3. In a culinary utensil, in combination, a shaft having first and second wheels centrally mounted while being secured for rotation therewith, said first wheel having a centrally located boss with its periphery forming a bearing surface, means mounting said second wheels permitting tilting thereof with its axis transverse to the axis of said shaft, a floating plate journaled on said shaft between said wheels, said plate having a bottom portion projecting from one side of the shaft and beyond the tangential plane on which the first wheel bears, the upper portion of said plate having integral therewith a substantially U-shaped resilient member, opening downwardly in inclined relation toward the said bottom portion and being so proportioned as to lie in contact with the inwardly directed face of said second wheel when in assembled relation, a sleeve member journaled on said shaft in contact with the outward face of said second wheel, the wheel contacting face of said sleeve being on a bias with respect to its axis whereby under said spring pressure said second wheel is inclined, means for maintaining said inclination of said second wheel so that its lowermost peripheral portion will be spaced from said plate less than its uppermost peripheral portion during rotary movement of said wheels.

4. In a culinary utensil, in combination, a shaft having first and second wheels centrally mounted while being secured for rotation therewith, said first wheel having a centrally located boss with its periphery forming a bearing surface, means mounting said second wheel permitting tilting thereof with its axis transverse to the axis of said shaft, a floating plate journaled on said shaft between said wheels, said plate having a bottom portion projecting from one side of the shaft and beyond the tangential plane on which the first wheel bears, the upper portion of said plate having integral therewith a substantially U-shaped resilient member, opening downwardly in inclined relation toward the said bottom portion and being so proportioned as to lie in contact with the inwardly directed face of said second wheel when in assembled relation, a sleeve member journaled on said shaft in contact with the outward face of said second wheel, the wheel contacting face of said sleeve being on a bias with respect to its axis whereby under said spring pressure said second wheel is inclined, means for maintaining said inclination of said second wheel so that its lowermost peripheral portion will be spaced from said plate less than its uppermost peripheral portion during rotary movement of said wheels, an upturned finger located along the forward upright edge of the bottom portion of the plate and offset to extend in advance of the first wheel, said finger curved inwardly by a quarter twist from said upright edge to a flattened forward horizontal formation, said formation terminating tangential to the plane on which said wheel bears, thereby upturning that which is in the path of said first wheel into the path of the second wheel.

5. In a culinary utensil, in combination, a shaft having first and second wheels centrally mounted while being secured for rotation therewith, said first wheel having a centrally located boss with its periphery forming a bearing surface, means mounting said second wheel permitting tilting thereof with its axis transverse to the axis of said shaft, a floating plate journaled on said shaft between said wheels, said plate having a bottom portion projecting from one side of the shaft and beyond the tangential plane on which the first wheel bears, the upper portion of said plate having integral therewith a substantially U-shaped resilient member, opening downwardly in inclined relation toward the said bottom portion and being so proportioned as to lie in contact with the inwardly directed face of said second wheel when in assembled relation, a sleeve member journaled on said shaft in contact with the outward face of said second wheel, the wheel contacting face of said sleeve being on a bias with respect to its axis whereby under said spring pressure said second wheel is inclined, means for maintaining said inclination of said second wheel in a desired position during rotary movement of said wheels.

6. In a culinary utensil, in combination, a shaft having first and second wheels centrally mounted while being secured for rotation therewith, said first wheel having a centrally located boss with its periphery forming a bearing surface, means mounting said second wheel permitting tilting thereof with its axis transverse to the axis of said shaft, a floating plate journaled on said shaft between said wheels, said plate having a bottom portion projecting from one side of the shaft and beyond the tangential plane on which the first wheel bears, the upper portion of said plate having integral therewith a substantially U-shaped resilient member, opening downwardly in inclined relation toward the bottom portion and being so proportioned as to lie in contact with the inwardly directed face of said second wheel when in assembled relation, a sleeve member journaled on said shaft in contact with the outward face of said second wheel, the wheel contacting face of said sleeve being on a bias with respect to its axis whereby under said spring pressure said second wheel is inclined, means for maintaining said inclination of said second wheel in a desired position during rotary movement of said wheels, an upturned finger located along the forward upright edge of the bottom portion of the plate and offset to extend in advance of the first wheel, said finger curved inwardly by a quarter twist from said upright edge to a flattened forward horizontal formation, said formation terminating tangential to the plane on which said wheel bears, thereby upturning that which is in the path of said wheel into the path of the second wheel.

7. In a culinary utensil, in combination, a shaft having first and second wheels centrally mounted while being secured for rotation therewith, said first wheel having a centrally located boss with its periphery forming a bearing surface, means mounting said second wheel permitting tilting thereof with its axis transverse to the axis of said shaft, a floating plate journaled on said shaft between said wheels, said plate having a bottom portion projecting from one side of the shaft and beyond the tangential plane on which the first wheel bears, the upper portion of said plate having integral therewith a substantially U-shaped resilient member, proportioned to contact and tilt axially said second wheel, means for maintaining said inclination of said second wheel in a desired position during rotary movement of said wheels.

8. In a culinary utensil, in combination, a shaft having first and second wheels centrally mounted while being secured for rotation therewith, said first wheel having a centrally located boss with its periphery forming a bearing surface, means mounting said second wheel permitting tilting thereof with its axis transverse to the axis of said shaft, a floating plate journaled on said shaft between said wheels, said plate having a bottom portion projecting from one side of the shaft and beyond the tangential plane on which the first wheel bears, the upper portion of said plate having integral therewith a substantially U-shaped resilient member, proportioned to contact and tilt axially said second wheel, means for maintaining said inclination of said second wheel in a desired position during rotary movement of said wheels, an upturned finger located along the forward upright edge of the bottom portion of the plate and offset to extend in advance of the first wheel, said finger curved inwardly by a quarter twist from said upright edge to a flattened forward horizontal formation, said formation terminating tangential to the plane on which said wheel bears.

References Cited in the file of this patent

UNITED STATES PATENTS

| | | |
|---|---|---|
| 689,848 | Booth | Dec. 31, 1901 |
| 912,709 | Minneman | Feb. 16, 1909 |
| 932,631 | Molnar | Aug. 31, 1909 |
| 945,913 | Colborne | Jan. 11, 1910 |
| 1,530,279 | Minneman | Mar. 17, 1925 |
| 1,535,300 | Forster | Apr. 28, 1925 |
| 2,369,452 | Gamache | Feb. 13, 1945 |